United States Patent
Pirovano et al.

[11] Patent Number: 6,167,045
[45] Date of Patent: Dec. 26, 2000

[54] METHOD AND SYSTEM FOR RECEIVING DATA PACKETS IN A UNIDIRECTIONAL BROADCASTING SYSTEM

[75] Inventors: Tullio Pirovano, Vimercate; Franco Maggioni, Missaglia, both of Italy

[73] Assignee: International Business Machines Corporation, Armonk, N.Y.

[21] Appl. No.: 08/973,370
[22] PCT Filed: Jun. 19, 1995
[86] PCT No.: PCT/EP95/02348
§ 371 Date: Dec. 8, 1997
§ 102(e) Date: Dec. 8, 1997
[87] PCT Pub. No.: WO97/00563
PCT Pub. Date: Jan. 3, 1997

[51] Int. Cl.[7] .................................................. H04L 12/56
[52] U.S. Cl. ........................... 370/389; 370/475; 709/245
[58] Field of Search .................................... 370/349, 389, 370/390, 475; 709/245

[56] References Cited

U.S. PATENT DOCUMENTS

| | | | |
|---|---|---|---|
| 4,926,375 | 5/1990 | Mercer et al. | 364/900 |
| 4,949,394 | 8/1990 | Shiraichi et al. | 455/2 |
| 4,991,207 | 2/1991 | Shiraishi et al. | 380/9 |
| 5,128,934 | 7/1992 | Jasinski | 370/84 |
| 5,398,021 | 3/1995 | Moore | 340/825.27 |
| 5,555,446 | 9/1996 | Jasinski | 455/54.2 |
| 5,715,243 | 2/1998 | May | 370/349 |
| 5,724,357 | 3/1998 | Derks | 370/349 |

FOREIGN PATENT DOCUMENTS

| | | | |
|---|---|---|---|
| 0256526 | 2/1988 | European Pat. Off. | H04L 11/20 |
| 0528730 | 2/1993 | European Pat. Off. | G06F 12/14 |
| 92/17014 | 10/1992 | WIPO | H04L 12/28 |

*Primary Examiner*—Huy D. Vu
*Assistant Examiner*—Dung Trinh
*Attorney, Agent, or Firm*—Daniel E. McConnell

[57] ABSTRACT

Information providers act as sources of information consisting of a plurality of variable length messages and issue control packets, enabling/disabling packets and data packets. Each data receiver has a unique address as a permanent attribute. The enabling/disabling packets selectively enable or disable a specific data receiver or a specific group of data receivers. Therefore to avoid that the loss of the enabling/disabling packet leads to the loss of the corresponding whole set of packets, each data receiver stores data packets for later use in the re-establishment of the entire set of transmission packets. However, only data packets provided by any FRIEND information provider (i.e. information provider from which the data receiver is authorized to receive information on a selective basis) are managed by the data receiver. Then when, during a re-transmission, a enabling/disabling packet related to the information stored into the data receiver is received, such information is immediately made available to the user of the data receiver, without waiting for its complete re-transmission.

7 Claims, 4 Drawing Sheets

METHOD AND SYSTEM FOR RECEIVING DATA PACKETS IN A UNIDIRECTIONAL BROADCASTING SYSTEM

FIELD OF THE INVENTION

The invention relates to a method and system for the transmittal of data over a unidirectional broadcasting system.

BACKGROUND OF THE INVENTION

A unidirectional broadcasting system consists of a number of information providers which are connected and send information to a broadcaster that has the function of transmitting the information received from the information provider to a plurality of data receivers through a broadcasting channel, wherein data receivers have no possibility of sending any information back to the information providers or to the broadcaster. A broadcast system can reach a high number of data receivers in a large territory, theoretically without any limit. Examples of unidirectional broadcasting systems are television and radio broadcasting systems.

The availability of well-working broadcasting systems such as the television systems, able to allow the transmission of data to many end-users distributed in a large territory over a broadcast channel without considerable added costs, increases the research in such a field.

A method of providing unidirectional transmittal of data from a plurality of information providers to one or more data receivers over a broadcasting system is disclosed in the published European Patent Application EP-491069-A1. This application describes a connection-oriented transmission protocol wherein connection packets activate a "virtual" data channel, over which data can be conveyed from a calling terminal (information provider) to a called terminal (data receiver). The connection can be terminated by a disconnection packet or by using timeout mechanisms. Connection packets cause a calling terminal to be actually connected to a called terminal over the virtual data channel only if the destination address of the connection packet matches the specific calling terminal address, stored in the called terminal. This virtual data channel is identified only by the calling terminal address. Data packets are identified only by the destination address so that data flow can be routed over the corresponding virtual data channel. The information-providers act as sources of information consisting of a plurality of variable length messages and issue control packets, enabling/disabling packets and data packets. Each data receiver has a unique address as a permanent attribute. The enabling/disabling packets selectively enable or disable a specific data receiver or a specific group of data receivers. The grouping of the data receivers is managed and updated remotely by each information provider through control packets.

However, when the transmission system is unidirectional, like in a broadcasting channel, information is transmitted on an optimistic basis. In fact, through the broadcasting channel, the called terminal cannot inform back the calling terminal about errors occurring either over the channel or in the called terminal itself (e.g. terminal failure or temporary problems, unrecovered long duration noise, etc). Beside that, connection oriented protocols used over broadcasting channels are critical because of the intrinsic high dependency of data reception on the connection packet. The loss of this packet causes the loss of all subsequent data packets.

Consequently, it can be useful to retransmit the same information over the broadcasting channels, at different times. For example, the whole set of packets could be retransmitted again more times at time intervals in the optimistic expectation that the cause of the loss of the connection packet has ceased or has been removed and that this favourable condition lasts for a time period sufficient for the data receiver to successfully and consecutively receive the entire set of packets. Unfortunately, experience has shown that transmission disturbances or interruptions may last for long times and in some cases the above approach is unsuccessful. In fact the possibility of losing the connection packet upon long duration transmission disturbances or interruptions leads to the loss of the corresponding whole set of packets thus frustrating the expected benefits of the retransmission.

Therefore there is a need for a method and system allowing a data receiver to receive individual data packets or groups of data packets for later use in the re-establishment of the entire set of transmission packets.

SUMMARY OF THE INVENTION

In accordance with the present invention, there is provided a method for receiving unidirectionally transmitted data over a broadcasting channel, said data consisting of a plurality of variable length messages, split into data packets, sent by at least one information provider to at least one data receiver, each data packet including at least two identifiers, a first identifier identifying the sending information provider and a second identifier identifying the message sent by said information provider owning the packets, the first and second identifiers forming a packet address, identifying univocally each message transmitted over the broadcasting channel, at least one data packet further including a third identifier identifying a data receiver, the method comprising the steps of: maintaining in the data receiver a list of information providers from which said data receiver is authorized to receive information on a selective basis; retrieving from each data packet received the packet address and said third identifier, it any; validating said packet address as relating to data directed to said data receiver, when said third identifier identifies said data receiver; making available to any user of the data receiver all the data packets identified by the validated packet address; the method being characterized by further comprising the steps of: storing in said data receiver each data packet having the first identifier, contained in the packet address, included in said list of information providers, provided that the data receiver has not received yet any data packet including said third identifier validating said packet address; making available to any user of the data receiver all the stored packets identified by said packet address, after the receipt of said third identifier, during re-transmission, validating said packet address.

The invention allows a receiving terminal to receive, on an optimistic base, data packets pertaining to a specific virtual broadcasting channel that has not been actually enabled because of a loss of the connection packet. For data packets received over this "orphan" connection the destination address is not known a priori. Even if it is not possible to establish whether these data are directed to a specific called terminal, data is received "sub judice" by any receiving terminal, having a possibility of access to the specific virtual broadcasting channel. Then, during subsequent transmissions of the same information message a receiving terminal can determine whether some "orphan" data packets were directed to it and consider them as properly received.

However, some difficulties still remain if a lot of "orphan" data packets are received "sub judice" by one or more receiving terminal and stored. In this case, each receiving terminal has to collect and later evaluate such data, causing a reduced performance of the system.

In one arrangement of the invention is provided a method which further comprises the step of discarding all the data packets stored in the data receiver identified by a same packet address, after receipt of a data packet including the same packet address and the third identifier not identifying said data receiver. Moreover, the method further comprises the step of discarding the data packets received including said same packet address. Finally, the method further comprises the step of selecting a time period and discarding all the data packets stored in the data receiver identified by a same packet address not validated within said time period.

This method overcomes the above difficulties. However, the process of storing in a data receiver some information which can be not directed to it, may cause some security problem. In fact, a user may try to misappropriate such stored information.

Therefore, in a preferred embodiment of the present invention, a method is provided wherein the step of storing in the data receiver the received data packet identified by a non validated packet address, includes the step of encrypting the data packet information contents.

Viewing another aspect of the present invention, there is also provided a system for receiving unidirectionally transmitted data over a broadcasting channel, said data consisting of a plurality of variable length messages, split into data packets, sent by at least one information provider to at least one data receiver, each data packet including at least two identifiers, a first identifier identifying the sending information provider and a second identifier identifying the message sent by said information provider owning the packets, the first and second identifiers forming a packet address, identifying univocally each message transmitted over the broadcasting channel, at least one data packet further including a third identifier identifying a data receiver, the system comprising means for maintaining in the data receiver a list of information providers from which said data receiver is authorized to receive information on a selective basis;means for retrieving from each data packet received the packet address and said third identifier, if any; means for validating said packet address as relating to data directed to said data receiver, when said third identifier identifies said data receiver; means for making available to any user of the data receiver all the data packets identified by the validated packet address; the system being characterized by further comprising: means for storing in said data receiver each data packet having the first identifier, contained in the packet address, included in said list of information providers, provided that the data receiver has not received yet any data packet including said third identifier validating said packet address; means for making available to any user of the data receiver all the stored packets identified by said packet address, after the receipt of said third identifier, during re-transmission, validating said packet address.

BRIEF DESCRIPTION OF THE DRAWINGS

An embodiment of the present invention will now be described, in connection with the cited European Patent Application EP-491069-A1, herein incorporated by reference, and with the accompanying drawings; wherein.

DESCRIPTION OF THE PREFERRED EMBODIMENTS

Figure 1:
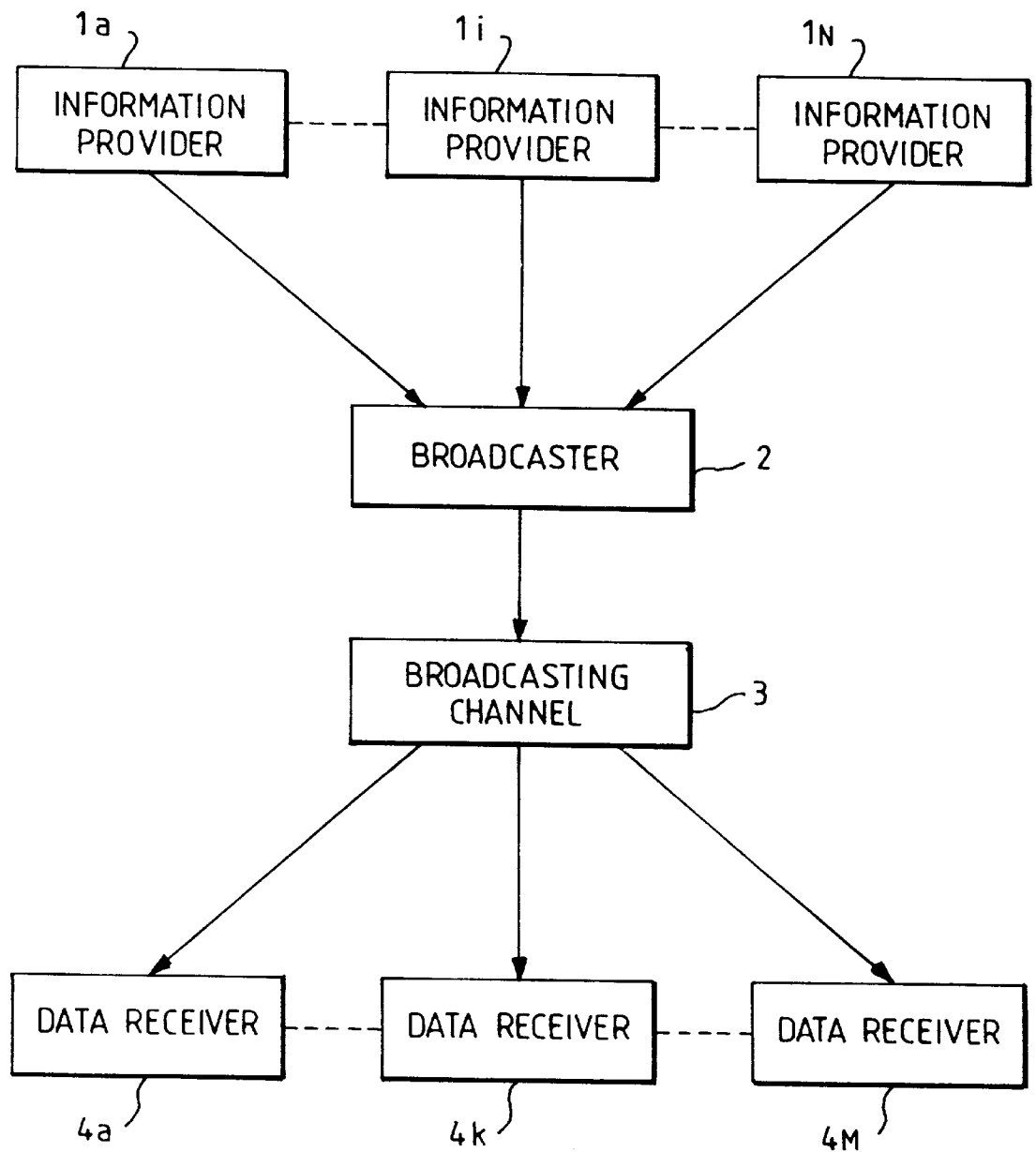
FIG. 1 depicts a schematic view of a broadcast system wherein the present invention can be implemented.

Referring to FIG. 1, a plurality of information providers $1_a$ to $1_N$ are connected to a broadcaster 2 having the function of transmitting the data received from the information provider to a plurality of data receivers $4_a$ to $4_M$ through a broadcasting channel 3. In the following an information provider may also be referenced as "calling terminal" and a data receiver as "called terminal".

The broadcaster 2 is a specific unit having the function of collecting and transmitting the data received from the information providers. However, the broadcaster may also transmit data originated by itself, acting in this case as an information provider.

An improved selective distribution mechanism ensuring N×M unidirectional connections over a broadcasting channel between N information providers and M data receivers is provided. Data is structured as digitally encoded packets having either data for transfer or information for various control purposes, as it will be described in further detail.

A state-of-the-art data receiver in a unidirectional broadcasting system is provided with the following characteristics:

a) it includes a non-volatile memory used to store a list of the information providers from which the data receiver is authorized to receive information: the Information Provider Table (IPT). The list includes the following data:

<information_provider_id><ip_timeout>, where:

<information_provider_id> is a unique identifier of the source of data (information provider);

<ip_timeout> identifies the timeout after which the information received by the information provider is removed from the data receiver storage memory.

b) it is identified by a unique identifier <unique_identifier>, representing a permanent attribute. This identifier preferably is assigned by the manufacturer and is the address of the data receiver.

Selective transmission is achieved by establishing a connection between an information provider, and a specific data receiver being identified by a unique identifier. Each information provider may concurrently transmit, in time division, different messages or data arranged in packets to a data receiver, or to different data receivers or groups of data receivers. Once a connection is established, it is possible to transmit data from the information provider to the connected data receiver(s). A connection is terminated either as the result of a specific command issued by the calling terminal or automatically after a given connection timeout.

Figure 2:
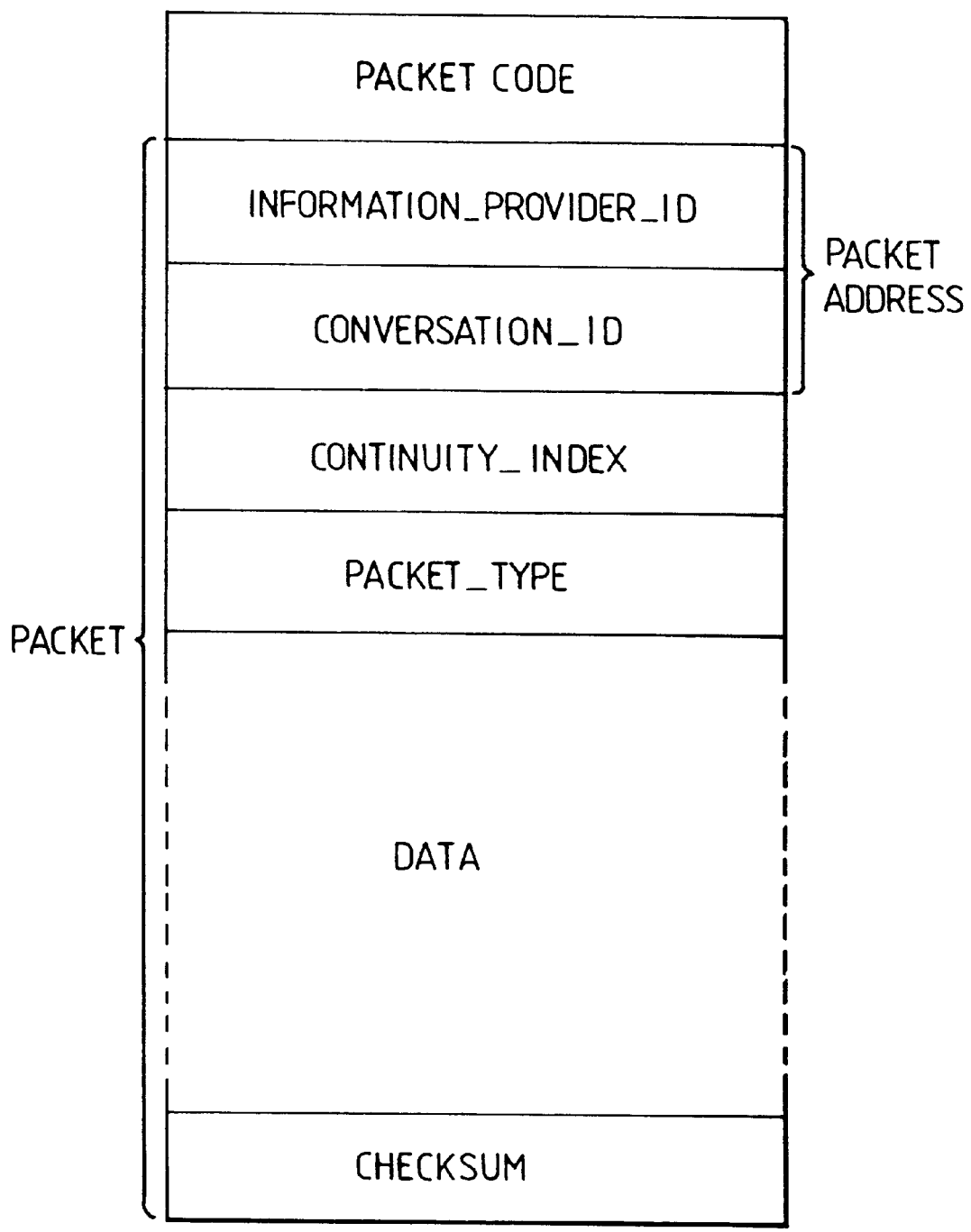
FIG. 2 depicts a general packet structure according with the present invention.

The method herein described makes use of a "packet oriented" transmission protocol, where the generic packet has, preferably, a fixed length and a structure as depicted in FIG. 2. In such a protocol, the data file is divided into a sequence of blocks and each block is divided into packet units of data to be sent to the data receiver. Then the data receiver rebuilds the complete data file re-assembling the packet units of data into blocks and then the blocks into the original file. In the following the symbol "::=" means "is composed by".

The <packet> format is
<packet>::=<packet_address><packet_type><data>.
The <packet_address> format is
<packet_address>::=<information_provider_id><conversation_id>, wherein:

<packet_address> identifies univocally each data file transmitted over the broadcasting system by a specific information provider;

<information_provider_id> identifies the information provider or the source of information;

<conversation_id> identifies the data file sent by the specified information provider, such a data file will be de-assembled in data packets during the transmission from the information provider to the data receiver(s). For every value of <information_provider_id>, the <conversation_id> is increased at each transmission of different data field and is cyclic, i.e. after having reached a maximum value it restarts from the initial value. The maximum value is to be defined in order to prevent interference between different data file.

<packet_type> is an identifier, specifying the type of the packet as indicated in the following;

<data> contains the data information or one or more control identifiers.

Preferably, the <packet> structure further comprises:

<continuity_index> which is a progressive cyclic index of the packet which indicates whether a packet is being re-transmitted. This allows the decoder of any called terminal to recognize a newly received packet as a copy of a previously received packet;

<checksum> which is an error checking code that allows detection of errors in the packet. This code can be implemented as a cyclic redundancy code (CRC) applied to the <data> field. The other fields of the packet (<packet_address>, <continuity_index>, <packet_type>) can be protected with error detection and correction policies for example (Hamming code 8/4).

<packet_code> which identifies the beginning of the <packet> for synchronization purposes.

A preferred list of values assumed by <packet_type> with the related <data> field structure is hereinafter described. This list contains all the information which the present invention needs to improve the state-of-the-art unidirectional broadcasting system.

CR connection request packet. It establishes a connection between a calling terminal and the called terminal(s). Establishing a connection means that the called terminal marks as available to the user all the packets carrying a <packet_address> equal to the one contained in CR packet. The <data> field is so structured:
<data>::=<receiver_address_id><connection_duration><data_info>

Where <receiver_address_id> identifies the address of the called terminal and <connection_duration> identifies the timeout after which the data received associated to the <packet_address> are swapped out from the main memory to the storage memory to improve the system capability.

DR disconnection request packet. It activates the swap-out process for the data received identified by the <packet_address>; at the same time it marks as available to the user all the packets carrying such <packet_address> if not already done. The <data> field is so structured:
<data>::=<receiver_address>

DT starting data packet. Since the data file is disassembled into blocks, this packet identifies the start of a block of data packets. In fact, to reduce the protocol overhead, it can be useful to send a sequence of data packets to form a block. The structure of the block is such that the first data packet only conveys the block length, whereas the following packets convey data only. The <data> field of this packet is so structured:
<data>::=<block_number><block_len><data_unit>, wherein:

<block_number> is the number of the block of the data file;

<block_len> is the size in byte of the block;

<data_unit> represents the starting packet unit of data of the block;

DF non-starting data packet. This packet conveys only data. A number of DF packets (up to the length specified in the DT packet) follows a DT packet. The <data> field of the packet is so structured:
<data>::=<data_unit>

<data_unit> represents a packet unit of data of the block <block number> identified in the previously received DT packet.

DV vital information packet. This packet transfers the information necessary to reassemble the data block to form a higher level entity (i.e. a data file). The <data> field of this packet is so structured:
<data>:=<total_blocks_in_file><file_len><file_val$_{13}$ code><file_name>
where:

<total_blocks_in_file> is the total number of blocks into which the file was disassembled.

<file_len> is the size in bytes of the file;

<file_val_code> is a code that allows to verify the completeness and correctness of the data file received;

<file_name> is the name of the data file or a data file identifier.

TS time stamp packet. This packet is used to distribute a central clock for adapter synchronization purposes.

In addition to the above other state-of-the-art packet types are used, for instance to manage groups of data receivers.

Figure 3:
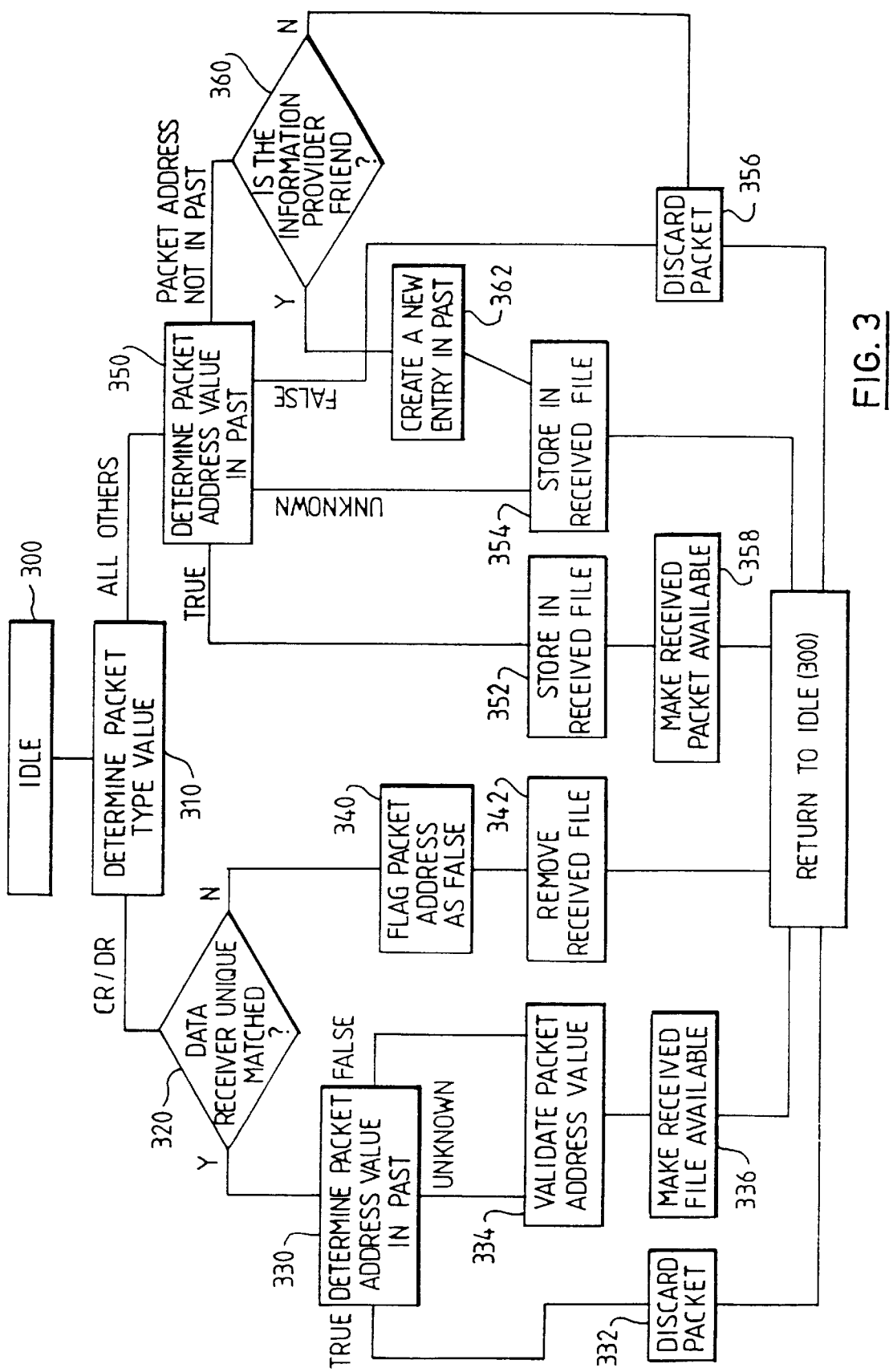
FIG. 3 depicts a block diagram of the apparatus implementing the transmission protocol of the invention.

Hereinafter only the part referring to the new improvement with respect to the prior art methods will be described, with reference to the previously defined packet structure and types and to FIG. 3.

At start time, the data receiver is in an IDLE state 300. When a packet is received, test 310 is performed to determine the type of the packet. If a CR or a DR <packet_type> value is received the <packet_address> field of the packet is retrieved to be compared with a list of packet addresses which are maintained by the data receiver: the Packet Address Stored Table (PAST). Each entry of PAST is formed by a field (<packet_address_stored) and a pointer to a file (<received_file>). Each <packet_address_stored> assumes one of three different values:

TRUE when a CR or DR packet including such <packet_address> has been received, comprising a <receiver_address_id> which matches the data receiver <unique_identifier>;

FALSE when a CR or DR packet including such <packet_address> has been received, comprising a <receiver_address_id> which does not match the data receiver <unique_identifier>

UNKNOWN when no CR or DR packet including such <packet_address> has been received and the packet comes from a FRIEND information provider, i.e. the <information_provider_id> part of the <packet_address> is included in the Information Provider Table (IPT) of the data receiver.

Then, each <packet_address_stored> is associated, by the pointer, to a file <received_file> which will be used by the data receiver to store each data packet identified by such <packet_address>. If no corresponding <packet_address_stored> exists and the information provider is a FRIEND one, a new entry is added to the list with UNKNOWN value and associated to a new empty <received_file>, as further described. In step 320 a test is performed to check if the <receiver_address_id> carried by the packet in the <data> field matches the data receiver identifier <unique_identifier>. If so the control passes to step 330, wherein the value of the <packet_address_stored> corresponding to the <packet_address> is checked. Then, if the value is TRUE, the data receiver discards the packet in step 332; consequently the process returns to the idle state 300. If a FALSE or UNKNOWN value is retrieved, the control is passed to step 334, wherein the value of the <packet_address_stored> corresponding to the received <packet_address> is changed to TRUE, thus validating the <packet_address> as actually addressed to the specific receiver. In step 336 the pointed <received_file>, if any, becomes available to the user; therefore, the process returns to the idle state 300.

Coming back to step 320, if the match is unsuccessful, in step 340 the <packet_address_stored> corresponding to the received <packet_address> is flagged as FALSE and in step 342 the associated <received_file>, if any, is discarded.

If the type of the packet value is other than 'CR' or 'DR', then from test 310 the process passes to step 350, wherein the <packet_address> included in the received packet is retrieved and compared with PAST in the data receiver. If the value of the corresponding <packet_address_stored> is TRUE, in step 352 the packet is stored in the pointed <received_file>and made available to the user in step 358; then the process returns to idle state 300. If the value is FALSE, in step 356, the packet is discarded without any other activity and the process return in the idle state 300. If the value is UNKNOWN, in step 354 the packet is stored in the pointed <received_file> but the packet, as the rest of the file, is not made available to the user, remaining "sub-judice" until it will be determined whether the file was directed or not to such data receiver. Finally the process returns to the idle state 300. Then, if in step 350 no <packet_address_stored>corresponding to the <packet_address> is found in PAST, in step 360 it is tested if the information provider is a FRIEND one; if so, in step 362 a new entry is added with an UNKNOWN value and having the associated pointer pointing to a new empty <received_file>, then the control passes to step 354. If the result of the test 360 is no, then the control passes to step 356.

Figure 4:
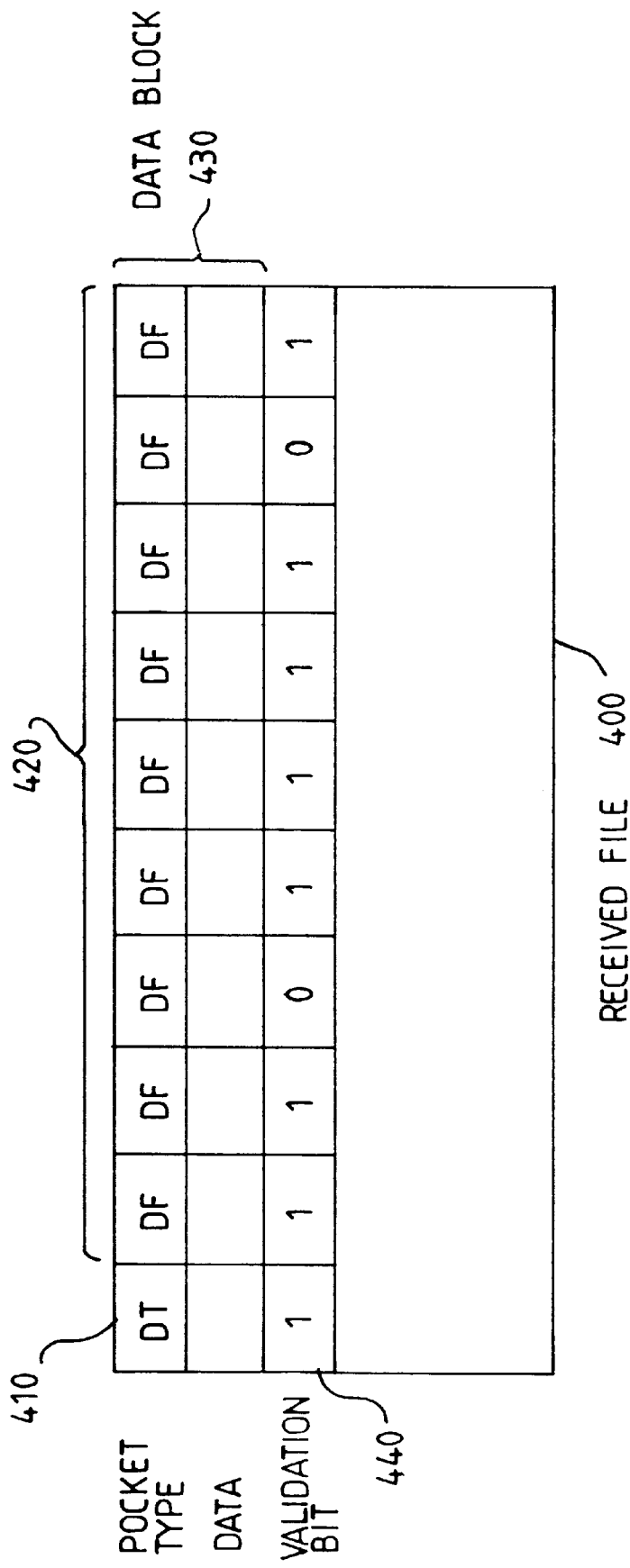
FIG. 4 depicts a structure of the data file wherein the packets received are stored.

Referring now to FIG. 4, the process to rebuild a data file will be disclosed. When data packets (DT, DF, DV) are received, they are assembled into data blocks 430. Each data block is made up of a DT packet 410 with a sequence of DF packets 420 so that the total block length (in bytes) reaches the one conveyed by DT packet, and the data blocks are written into a data file (<received_file>) 400, corresponding to the one identified by the <packet_address> conveyed by the packets. Preferably, a validation bit 440 is added to each data packet (DT, DF) 410, 420 received, showing if the packet has been properly received, testing the <checksum> value conveyed by each packet. The <received_file> maintains the visibility attribute of the data blocks, i.e. if the data blocks have the corresponding <packet_address_stored> value equal to UNKNOWN, the <received_file> will be hidden to the user. To reach this goal, many well known alternatives can be adopted ranging from simply vary the file attributes to more complex techniques like data encryption.

Each <received_file> is stored into a temporary directory. When all the data blocks have been received and the total length (<file_len>) of the <received_file> is reached or a timeout is lapsed, the completed <received_file> is renamed with the value carried by the DV packet and moved to the user directory, thus making it available to the user (including the corrupted data). Retransmissions, if any, of the same data have the same value of <packet_address> so it is possible to setup suitable merging policies among different data blocks. For instance, in a preferred embodiment, during a retransmission of a data file only the data packets DT and DF corresponding to the ones which have been lost or corrupted during a previous transmission (i.e. data packet stored having the validation bit equal to false) are managed. Then if the retransmitted packet data corresponds to a lost data packet this is added to the <received_file>, while if such a data packet corresponds to a corrupted data packet this replaces the corrupted one into the <received_file>. Any <received_file> with <packet_address_stored> equal to UNKNOWN remains hidden until a retransmission of the same data file occurs: in this case if a CR or DR packet is received and the conveyed <packet_address> is validated, as previously disclosed, then the corresponding <packet_address_stored> is set to TRUE and the visibility attribute of the <received_file> is modified accordingly.

Preferably, when a CR packet is received the <received_file> corresponding to the <packet_address> conveyed by the packet is swapped into the main memory, to improve the capability of the process while the data block are being collected, and it will be swapped out to the disk storage, when one of the following conditions occurs:

a DR packet with the same <packet_address> is received;
  the timeout, carried in the <connection_duration> field of the CR packet, is lapsed;
  a new CR packet has to be received and the main memory has no more space available for storing the new <received_file>. In the preferred embodiment n <received_files> can be stored at the same time in the main memory with a FIFO algorithm managing the in/out procedure for each <received_file>.

Preferably, a garbage collection routine has to be setup to delete each UNKNOWN <received_file> which is older than the defined parameter <ip_timeout> contained in the IPT. In this way each different information provider is provided with a different timeout, depending on the type of the data sent over the broadcasting channel

What is claimed is:

1. For use in a data receiver which receives messages in the form of one or more data packets transmitted from one or more information providers over a broadcasting channel, each data packet including a packet address having at least a first identifier identifying a sending information provider and a second identifier identifying a particular message being sent by the sending information provider, at least one of said data packets including a third identifier identifying a data receiver, a method of processing received data packets comprising the steps of:

maintaining a list of information providers from which the data receiver is authorized to receive and process messages;

storing each data packet received from an information provider included on the maintained list of information providers;

detecting a data packet having a particular packet address and a third identifier identifying a data receiver other than said data receiver;

discarding any stored data packet having the same packet address as the packet address found in the data packet detected in the preceding detecting step; and where a data packet having a particular packet address and a third identifier identifying said data receiver is received from an information provider included on the maintained list of information providers, making available to a user of said data receiver any stored or subsequently received data packets having said particular packet address.

2. A method as set forth in claim 1 including the additional step of discarding any subsequently received packets having the same packet address as the discarded stored packets.

3. A method as set forth in claim 1 or 2 including the additional steps of:

upon receipt and storage of the first packet having a particular packet address, starting a timer having a predetermined timeout period;

generating a time-expired signal upon expiration of the timeout period without receipt of a data packet having said particular packet address and a third identifier identifying said data receiver;

in response to the generated time-expired signal, discarding any stored packets having the particular packet address.

4. For use in a system having one or more information providers for broadcasting messages to one or more data receivers, said messages comprising one or more data packets, each of which includes a packet address having at least a first identifier identifying the sending information provider and a second identifier identifying the message of which the data packet is a part, at least one of said data packets further including a third identifier identifying a particular data receiver, each data receiver having a packet processing system comprising:

an information provider memory for storing a list of information providers from whom said data receiver is authorized to receive and process messages;

a data packet memory for storing data packets received from information providers included on the list stored in said information provider memory;

receiver validation logic responsive to detection of a data packet having a particular packet address and a third identifier identifying said data receiver to generate an enabling signal; and logic responsive to generation of an enabling signal to release to a user any stored or subsequently received data packets having the same packet address.

5. A data receiver having a packet processing system as set forth in claim 4 further including:

logic for detecting a data packet having a particular packet address and a third identifier identifying a data receiver other than said data receiver; and memory control logic for discarding any stored data packet having the same packet address as the data packet detected in the preceding step.

6. A data receiver having a packet processing system as set forth in claim 5 further including storage control logic for discarding any subsequently received data packets having the same packet address as the data packets discarded from storage.

7. A data receiver having a packet processing system as set forth in any of claims 4 through 6 further including:

a timer having a predetermined time-out period;

timer control logic for starting said timer upon receipt and storage of a first data packet having a particular packet address and for generating a time-expired signal upon detection of expiration of a time-out period without receipt of a data packet having said particular packet address and a third identifier identifying said data receiver; and storage control logic responsive to said time-expired signal for discarding any stored packets having said particular packet address.

* * * * *